US011904443B2

(12) United States Patent
Wu

(10) Patent No.: US 11,904,443 B2
(45) Date of Patent: Feb. 20, 2024

(54) POSITIONING CLAMP AND CLAMPING DEVICE HAVING THE SAME

(71) Applicant: Ming-Chieh Wu, Taichung (TW)

(72) Inventor: Ming-Chieh Wu, Taichung (TW)

( * ) Notice: Subject to any disclaimer, the term of this patent is extended or adjusted under 35 U.S.C. 154(b) by 461 days.

(21) Appl. No.: 17/134,039

(22) Filed: Dec. 24, 2020

(65) Prior Publication Data

US 2021/0402570 A1 Dec. 30, 2021

(30) Foreign Application Priority Data

Jun. 29, 2020 (TW) ................................ 109121831

(51) Int. Cl.
*B25B 27/00* (2006.01)
*B25B 5/06* (2006.01)
*B25B 5/04* (2006.01)

(52) U.S. Cl.
CPC ................ *B25B 5/067* (2013.01); *B25B 5/04* (2013.01)

(58) Field of Classification Search
CPC .. B25B 5/00; B25B 5/04; B25B 5/067; B25B 5/082; B25B 5/125
See application file for complete search history.

(56) References Cited

U.S. PATENT DOCUMENTS 3,314,319 A * 4/1967 Schmidt .................. B25B 7/123 81/367
9,950,409 B2 * 4/2018 Grobbel .................... B25B 5/16
10,611,002 B2 * 4/2020 Meoli ..................... B25B 7/123
2013/0221593 A1 * 8/2013 Melchior .................. B25B 5/14 269/107
2021/0402570 A1 * 12/2021 Wu ......................... B25B 5/067

FOREIGN PATENT DOCUMENTS

CN 209615267 U 11/2019

* cited by examiner

*Primary Examiner* — Lee D Wilson
(74) *Attorney, Agent, or Firm* — Lewis Roca Rothgerber Christie LLP

(57) ABSTRACT

A clamping device includes a fixing clamp and a positioning clamp for clamping two plate pieces. The positioning clamp includes a main body having a first abutment surface and a second abutment surface separated by an abutment angle and suitable for respectively abutting against first plate surfaces of the plate pieces. A reversing mechanism includes a reversing member rotatably disposed in the main body and having a limiting portion. The reversing member is rotatable relative to the main body between a first side and a second side, in which the limiting portion is aligned with the first abutment surface and the second abutment surface, respectively, and is suitable for abutting against the end surfaces of the plate pieces.

9 Claims, 13 Drawing Sheets

POSITIONING CLAMP AND CLAMPING DEVICE HAVING THE SAME

CROSS-REFERENCE TO RELATED APPLICATION

This application claims priority of Taiwanese Patent Application No. 109121831, filed on Jun. 29, 2020.

FIELD

The disclosure relates to a clamp, more particularly to a positioning clamp and a clamping device having the same.

BACKGROUND

Referring to FIGS. 1 and 2, a conventional right angle positioning clamp 1, as disclosed in Chinese Patent No. CN209615267, mainly includes a fixed handle 11 and a movable handle 12 that can be operated, a movable arm 13 pivotally connected to the fixed handle 11 and the movable handle 12, and a supporting member 14 connected to the fixed handle 11. The movable arm 13 has a clamping block 131 having a right angle cross section. The fixed handle 11 and the movable handle 12 are used to drive the clamping block 131 and the supporting member 14 to clamp two plate pieces that intersect to form a "T" shape or an "L" shape.

Although the conventional right angle positioning clamp 1 is suitable for clamping an L-shaped plate piece 15, the L-shaped plate piece 15 must be a one-piece body or integrally connected as one body. If two plate pieces intersect each other to form an "L" shape, the supporting member 14 cannot achieve a limiting function on the plate pieces, and a user must visually and manually adjust the two plate pieces so as to form the "L" shape, and not "T" shape, so that use of the conventional right angle positioning clamp 1 is inconvenient.

SUMMARY

Therefore, an object of the present disclosure is to provide a positioning clamp and a clamping device having the same that can greatly improve the convenience and practicality of use and operation thereof.

According to one aspect of this disclosure, a positioning clamp suitable for positioning two plate pieces includes a main body and a reversing mechanism. Each plate piece has a first plate surface and an end surface intersecting at an angle. The main body has first and second abutment surfaces separated by an abutment angle and suitable for abutting against the first plate surfaces of the plate pieces, respectively. The abutment angle has an apex. The reversing mechanism includes a reversing member rotatably disposed in the main body and proximate to the apex. The reversing member has a limiting portion and is rotatable relative to the main body between a first side, in which the limiting portion is aligned with the first abutment surface and is suitable for abutting against the end surface of one of the plate pieces, and a second side, in which the limiting portion is aligned with the second abutment surface and is suitable for abutting against the end surface of the other plate piece.

According to another aspect of this disclosure, a clamping device is configured for mounting on a pair of pliers and is suitable for clamping two plate pieces. The pair of pliers includes a first handgrip, a second handgrip, a first clamping arm connected to the first handgrip, and a second clamping arm pivotally connected to the first and second handgrips.

Each plate piece has a first plate surface and an end surface intersecting at an angle, and a second plate surface opposite to the first plate surface. The clamping device includes a fixing clamp and a positioning clamp. The fixing clamp is configured to be connected to the second clamping arm and includes two pressing surfaces separated by a pressing angle of between 85° and 95°. The pressing surfaces are suitable for abutting against the second plate surfaces of the plate pieces, respectively.

The positioning clamp is suitable for positioning the two plate pieces and includes a main body and a reversing mechanism. The main body has first and second abutment surfaces separated by an abutment angle and suitable for abutting against the first plate surfaces of the plate pieces, respectively. The abutment angle has an apex. The reversing mechanism includes a reversing member rotatably disposed in the main body and proximate to the apex. The reversing member has a limiting portion and is rotatable relative to the main body between a first side, in which the limiting portion is aligned with the first abutment surface and is suitable for abutting against the end surface of one of the plate pieces, and a second side, in which the limiting portion is aligned with the second abutment surface and is suitable for abutting against the end surface of the other plate piece.

The fixing clamp and the positioning clamp are movable relative to each other for clamping the plate pieces therebetween when the first and second handgrips of the pair of pliers are operated.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
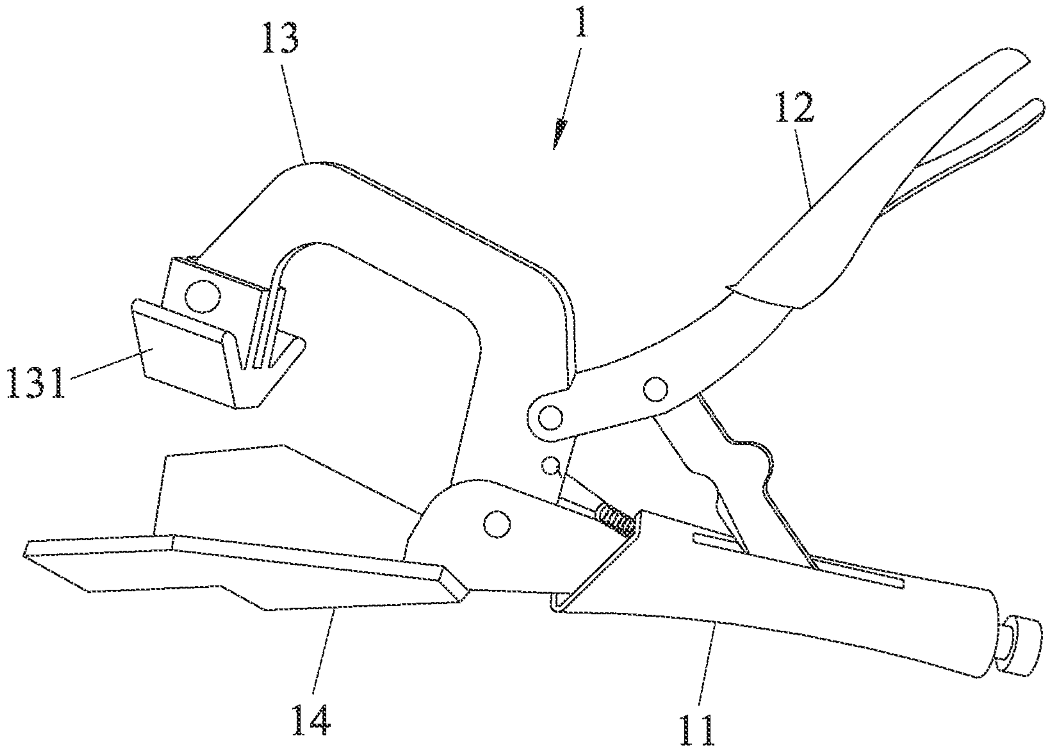
FIG.1 PRIOR ART
FIG. 1 is a perspective view of a conventional right angle positioning clamp disclosed in Chinese Patent No. CN209615267.
Figure 2:
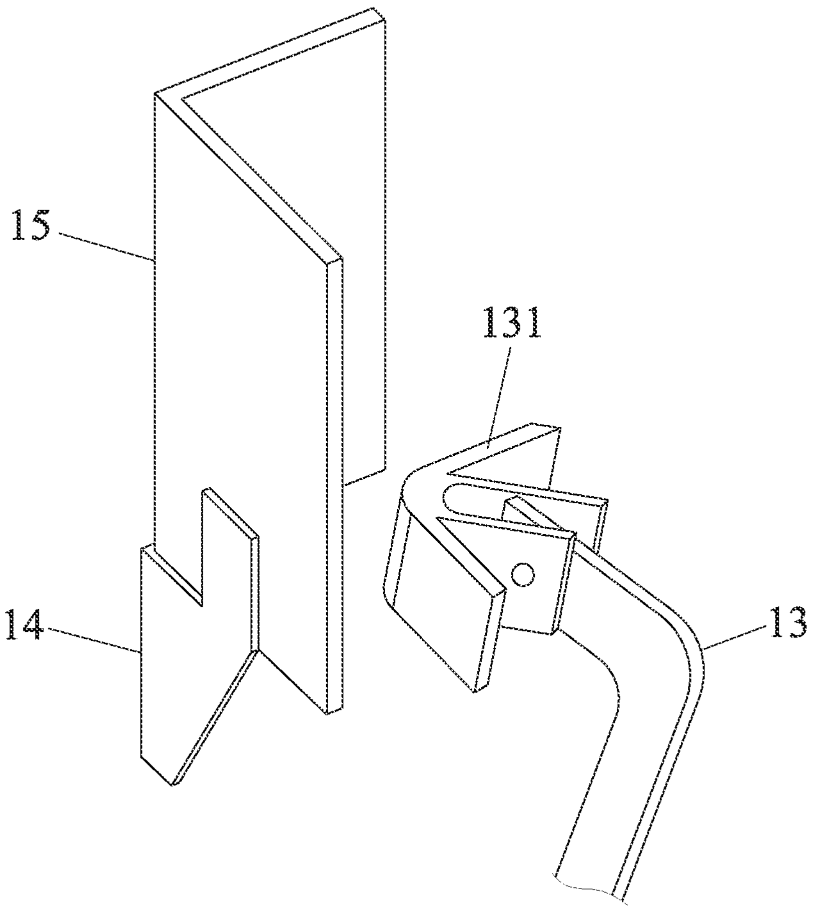
FIG.2 PRIOR ART
FIG. 2 is a perspective view, illustrating how the conventional right angle positioning clamp is used for clamping an L-shaped plate piece.

Before the present disclosure is described in greater detail with reference to the accompanying embodiments, it should be noted herein that like elements are denoted by the same reference numerals throughout the disclosure.

Figure 3:
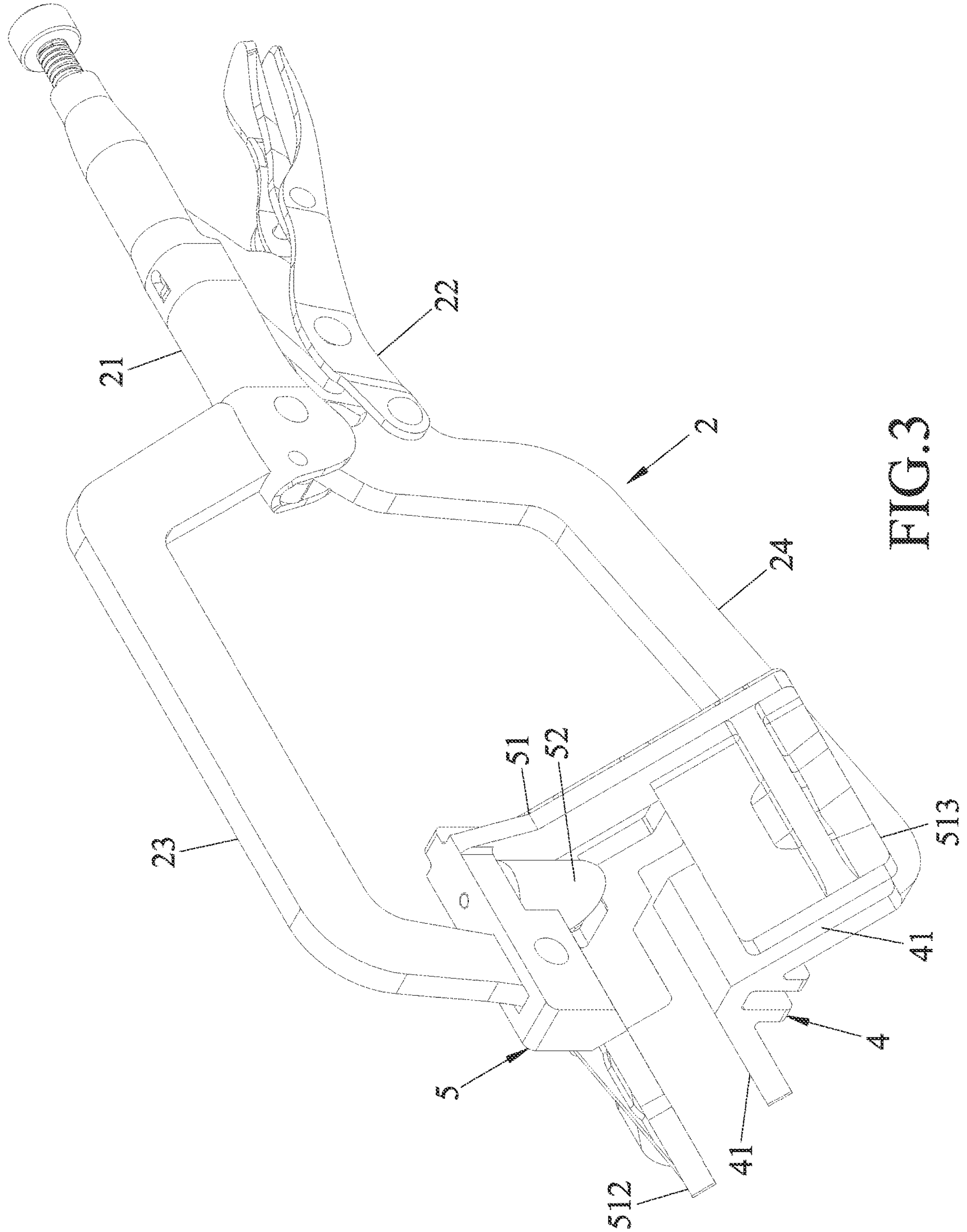
FIG. 3 is a perspective view, illustrating a clamping device according to the first embodiment of the present disclosure incorporated in a pair of pliers.
Figure 4:
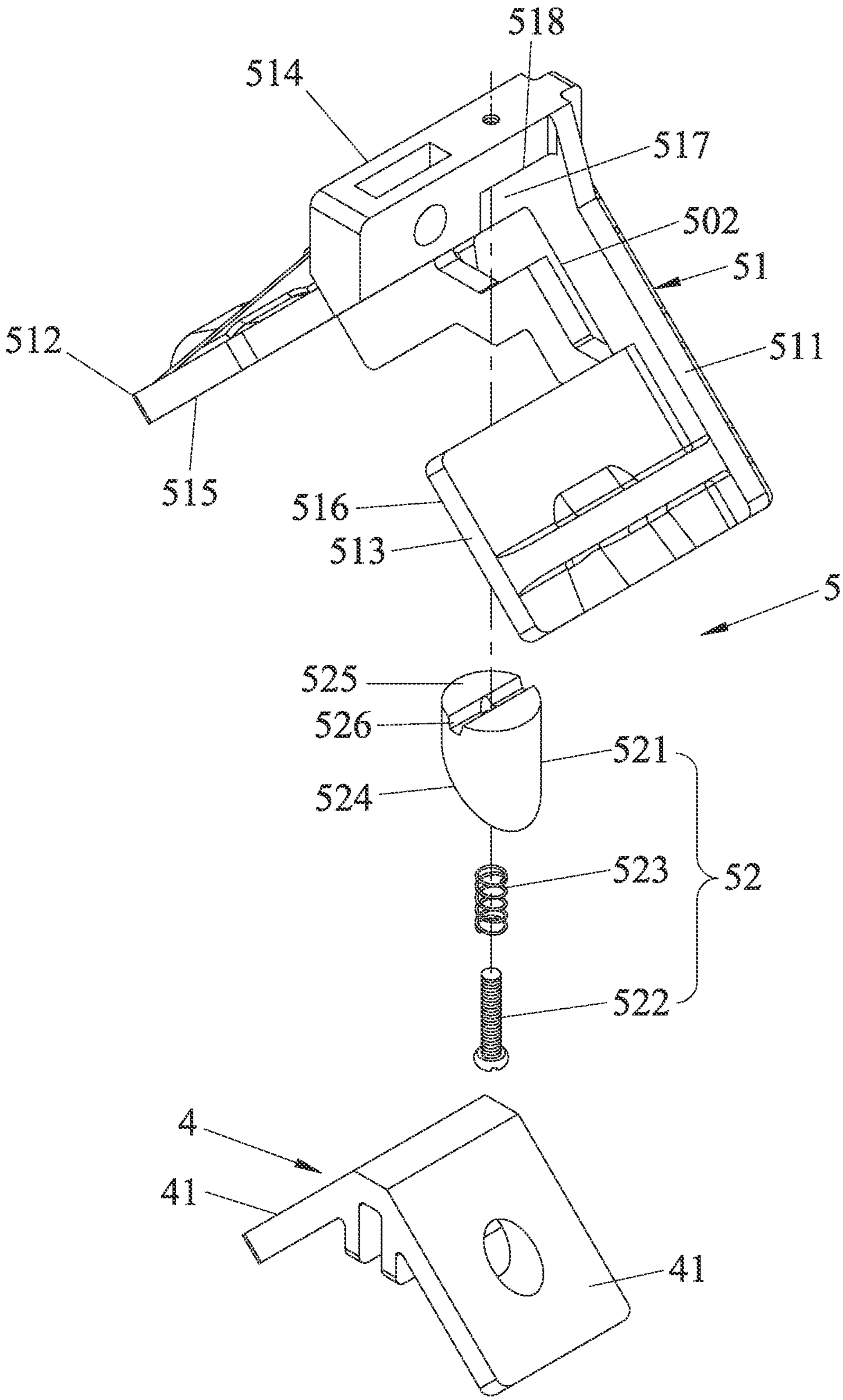
FIG. 4 is an exploded perspective view of the first embodiment.
Figure 5:
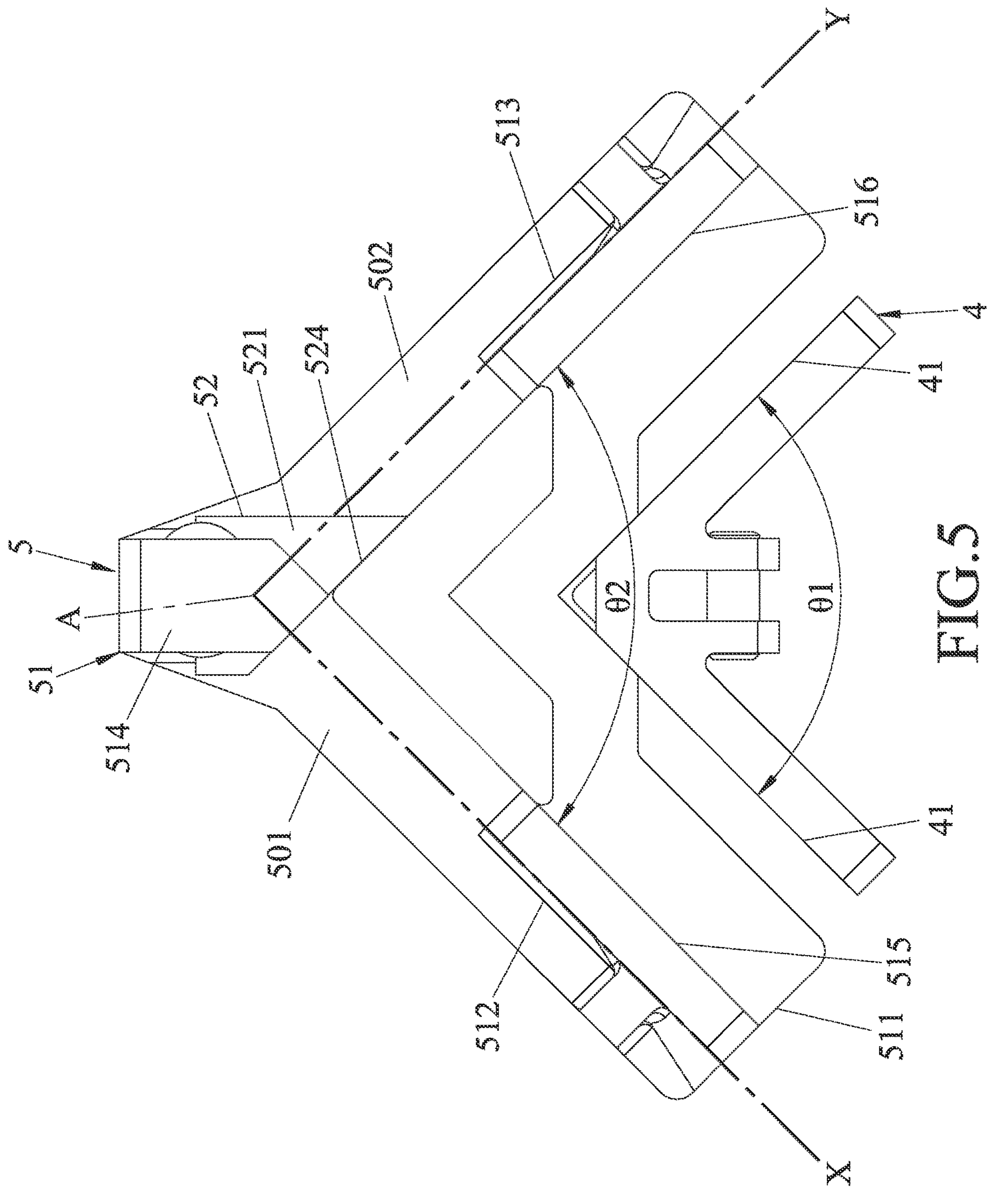
FIG. 5 is a schematic front view of the first embodiment.
Figure 6:
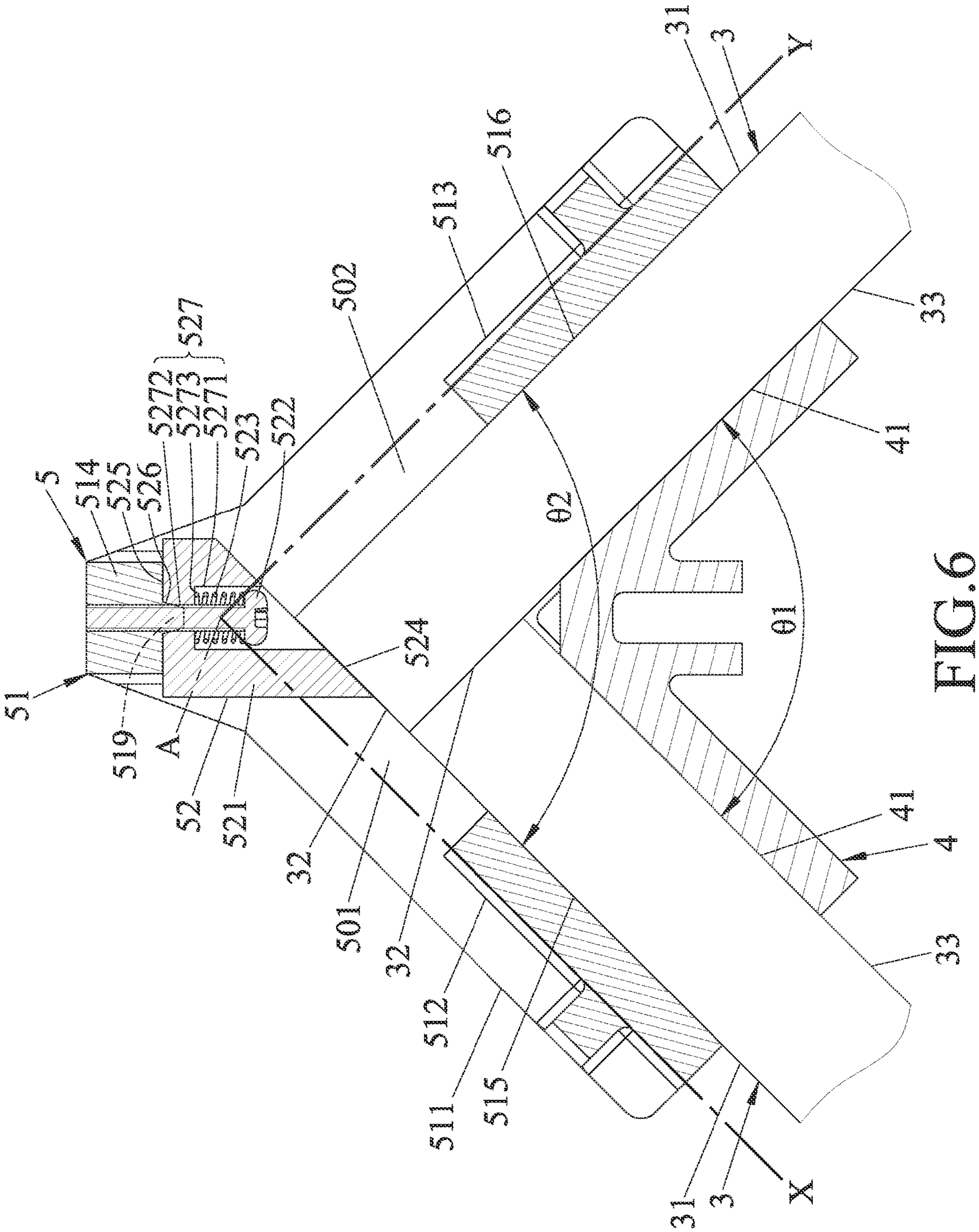
FIG. 6 is a sectional view, illustrating a reversing member of the first embodiment located on a first side, and a positioning clamp and a fixing clamp clamping two plate pieces intersecting to form an "L" shape.

Referring to FIGS. 3 to 5, a clamping device according to the first embodiment of the present disclosure is shown to be incorporated in a pair of pliers 2, is suitable for clamping two plate pieces 3 (see FIG. 6), and includes a fixing clamp 4 and a positioning clamp 5. The pair of pliers 2 includes first and second handgrips 21, 22, a first clamping arm 23 connected to the first handgrip 21, and a second clamping arm 24 pivotally connected to the first and second handgrips 21, 22. Referring to FIG. 6, each plate piece 3 has a first plate surface 31 and an end surface 32 intersecting at an angle, and a second plate surface 33 opposite to the first plate surface 31.

The fixing clamp 4 is connected to the second clamping arm 24, and includes two pressing surfaces 41 separated by a pressing angle (θ1) of between 85° and 95°. The pressing angle (θ1) is 90° in this embodiment.

The positioning clamp 5 is connected to the first clamping arm 23, and includes a main body 51 and a reversing mechanism 52.

With reference to FIGS. 4 to 6, the main body 51 includes a base plate 511, a first abutment plate 512 and a second abutment plate 513 connected to the base plate 511 and separated by an abutment angle (θ2), and a mounting plate 514. The abutment angle (θ2) is between 85° and 95°. In this embodiment, the abutment angle (θ2) is 90°, and has an apex (A). The first abutment plate 512 has a first abutment surface 515, while the second abutment plate 513 has a second abutment surface 516. The first abutment surface 515 and the second abutment surface 516 are separated by the abutment angle (θ2). The mounting plate 514 is connected to the base plate 511 between the first and second abutment plates 512, 513, and is proximate to the apex (A). The mounting plate 514 and the first abutment plate 512 define a first spacing 501 therebetween along a first direction (X). The mounting plate 514 and the second abutment plate 513 define a second spacing 502 therebetween along a second direction (Y) perpendicular to the first direction (X). The mounting plate 514 has a concave surface 518 defining a receiving space 517 and adjacent to the base plate 511, and two retaining portions 519 formed in the concave surface 518 and separated by 180 degrees. In this embodiment, the retaining portions 519 are protrusions. However, in other variations of this embodiment, the retaining portions 519 may be grooves.

The reversing mechanism 52 includes a reversing member 521, a bolt 522, and an elastic element 523.

The reversing member 521 is rotatably disposed in the receiving space 517, and is operable to move in a direction away from the mounting plate 514. In this embodiment, the reversing member 521 has a cylindrical shape, and has a limiting portion 524, a connecting surface 525 opposite to the limiting portion 524, an engaging portion 526 formed on the connecting surface 525 for engagement with the retaining portions 519, and a through hole 527 extending from the limiting portion 524 to the connecting surface 525. In this embodiment, the limiting portion 524 is an inclined surface, and the engaging portion 526 is a diametrically extending groove. However, in other variations of this embodiment, the engaging portion 526 may be two protrusions for engaging with a retaining portion 519 which is a groove. The through hole 527 has a large diameter hole portion 5271 adjacent to the limiting portion 524, a small diameter hole portion 5272 adjacent to the connecting surface 525, and a shoulder 5273 between the large diameter hole portion 5271 and the small diameter hole portion 5272.

Figure 8:
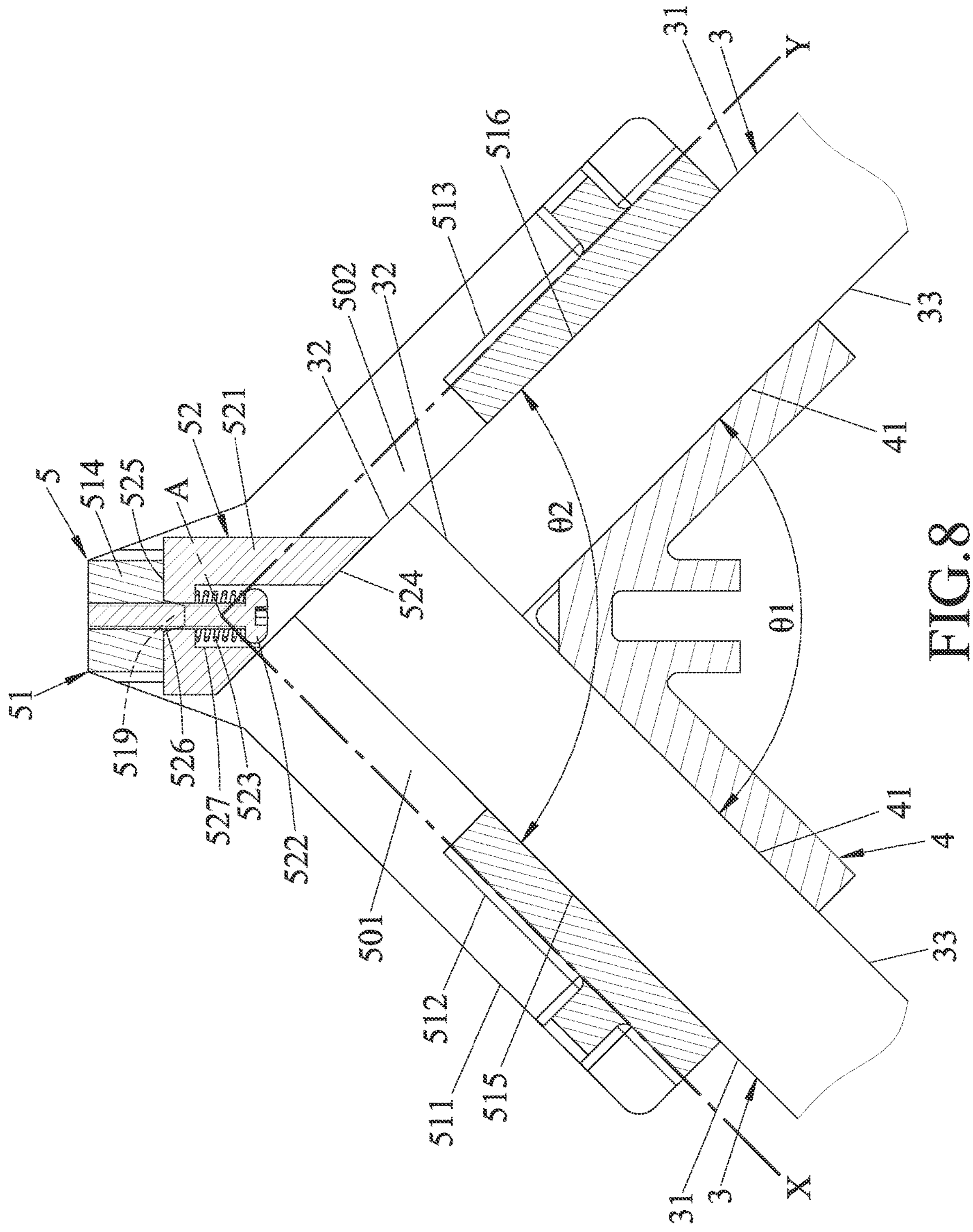
FIG. 8 is a view similar to FIG. 6, but illustrating the reversing member located on a second side.

The reversing member 521 is rotatable relative to the main body 51 between a first side (see FIG. 6) and a second side (see FIG. 8). In the first side, the limiting portion 524 is aligned with the first abutment surface 515 and is perpendicular to the second abutment surface 516. In the second side, the limiting portion 524 is aligned with the second abutment surface 516, and is perpendicular to the first abutment surface 515.

The bolt 522 extends through the through hole 527 and engages the mounting plate 514, so that the reversing member 521 is rotatable about the bolt 522 between the first side and second side.

The elastic element 523 is sleeved on the bolt 522, and has two opposite ends respectively abutting against the shoulder 5273 and a head of the bolt 522. The elastic element 523 biases the reversing member 521 to move toward the mounting plate 514.

With reference to FIG. 6, when the reversing member 521 is located on the first side, the limiting portion 524 abuts against the end surface 32 of one of the plate pieces 3, and the second abutment surface 516 abuts against the first plate surface 31 of the one of the plate pieces 3, so that the one of the plate pieces 3 can be positioned between the limiting portion 524 and the second abutment surface 516 of the positioning clamp 5. Further, the first abutment surface 515 abuts against the first plate surface 31 of the other one of the plate pieces 3, and the end surface 32 of the other one of the plate pieces 3 abuts against the second plate surface 33 of the one of the plate pieces 3. Through this, the two plate pieces 3 can respectively extend along the second direction (Y) and the first direction (X), and can intersect each other to form an "L" shape, thereby obtaining a limitation.

Figure 7:
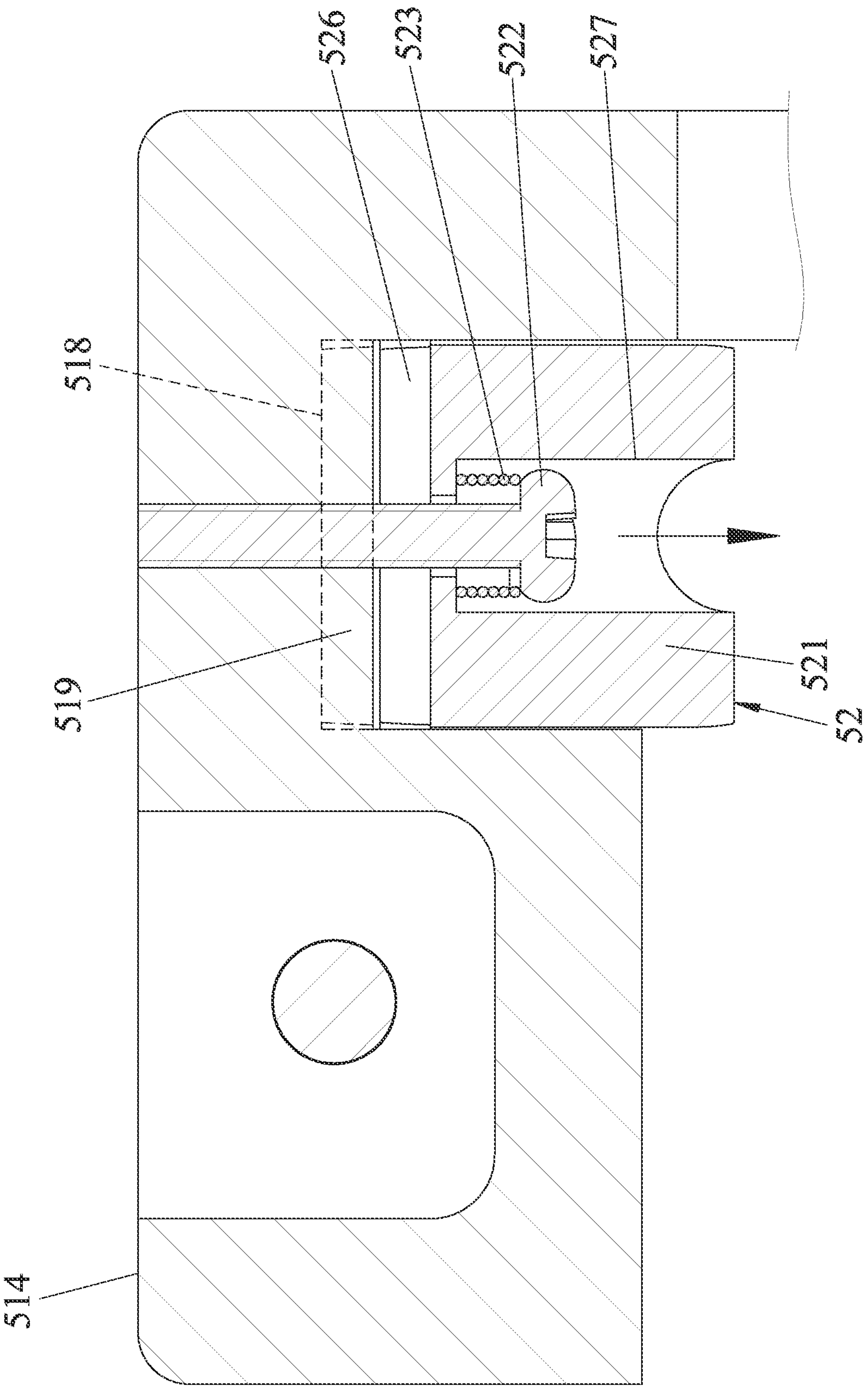
FIG. 7 is another sectional view, illustrating the reversing member of the first embodiment moving in a direction away from a mounting plate.

Referring to FIG. 7, to adjust the position of the reversing member 521, the reversing member 521 is simply pulled in a direction away from the mounting plate 514 by overcoming a biasing force of the elastic element 523 until the engaging portion 526 is separated from the retaining portions 519, so that the reversing member 521 can be rotated to the first side or to the second side. Afterwards, the pulling force on the reversing member 521 is released, so that the reversing member 521 can be biased by the elastic element 523 to move toward the mounting plate 514 until the engaging portion 526 engages again the retaining portions 519, thereby positioning the reversing member 521 on the mounting plate 514 at the desired position.

Referring to FIG. 8, when the reversing member 521 is located on the second side, the limiting portion 524 abuts against the end surface 32 of the other one of the plate pieces 3, and the first abutment surface 515 abuts against the first plate surface 31 of the other one of the plate pieces 3, so that the other one of the plate pieces 3 can be positioned between the limiting portion 524 and the first abutment surface 515 of the positioning clamp 5. Further, the second abutment surface 516 abuts against the first plate surface 31 of the one of the plate pieces 3, and the end surface 32 of the one of the plate pieces 3 abuts against the second plate surface 33 of the other one of the plate pieces 3. Through this, the two plate pieces 3 can respectively extend along the first direction (X)

and the second direction (Y), and can intersect each other to form an "L" shape, thereby obtaining a limitation.

Figure 9:
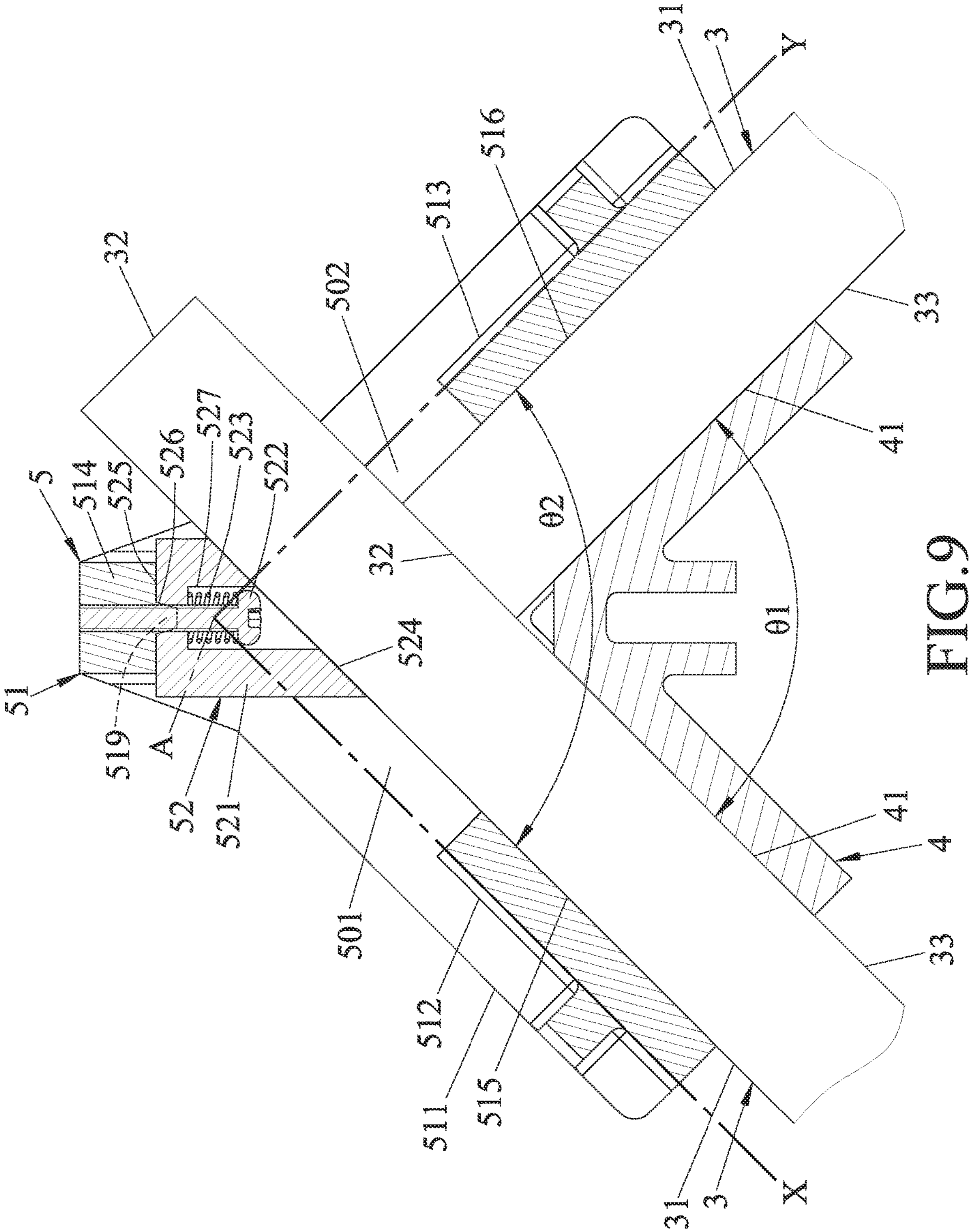
FIG. 9 is a view similar to FIG. 6, but illustrating the positioning clamp and the fixing clamp clamping two plate pieces intersecting to form a "T" shape.

Referring to FIG. 9, since the mounting plate 514 and the reversing member 521 are separated from the first abutment plate 512 by the first spacing 501 and are separated from the second abutment plate 513 by the second spacing 502, one of the plate pieces 3 can extend through the second spacing 502 along the first direction (X) and abut against the first abutment surface 515 and the limiting portion 524 of the reversing member 521 which is located on the first side, or extend through the first spacing 501 along the second direction (Y) and abut against the second abutment surface 516 and the limiting portion 524 of the reversing member 521 which is located on the second side, so that the end surface 32 of the other one of the plate pieces 3 can abut against the second plate surface 33 of the one of the plate pieces 3. Through this, the plate pieces 3 intersecting with each other to form a "T" shape can similarly obtain a limitation by the positioning clamp 5.

With reference to FIGS. 3, 6 and 8, to clamp the plate pieces 3, the first and second handgrips 21, 22 are simply operated to drive the first and second clamping arms 23, 24 toward one another and move the fixing clamp 4 and the positioning clamp 5 relative to each other, so that the pressing surfaces 41 of the fixing clamp 4 can respectively abut against the second plate surfaces 33 of the plate pieces 3, thereby clamping the plate pieces 3 that form the "L" shape or the "T" shape between the fixing clamp 4 and the positioning clamp 5.

Figure 10:
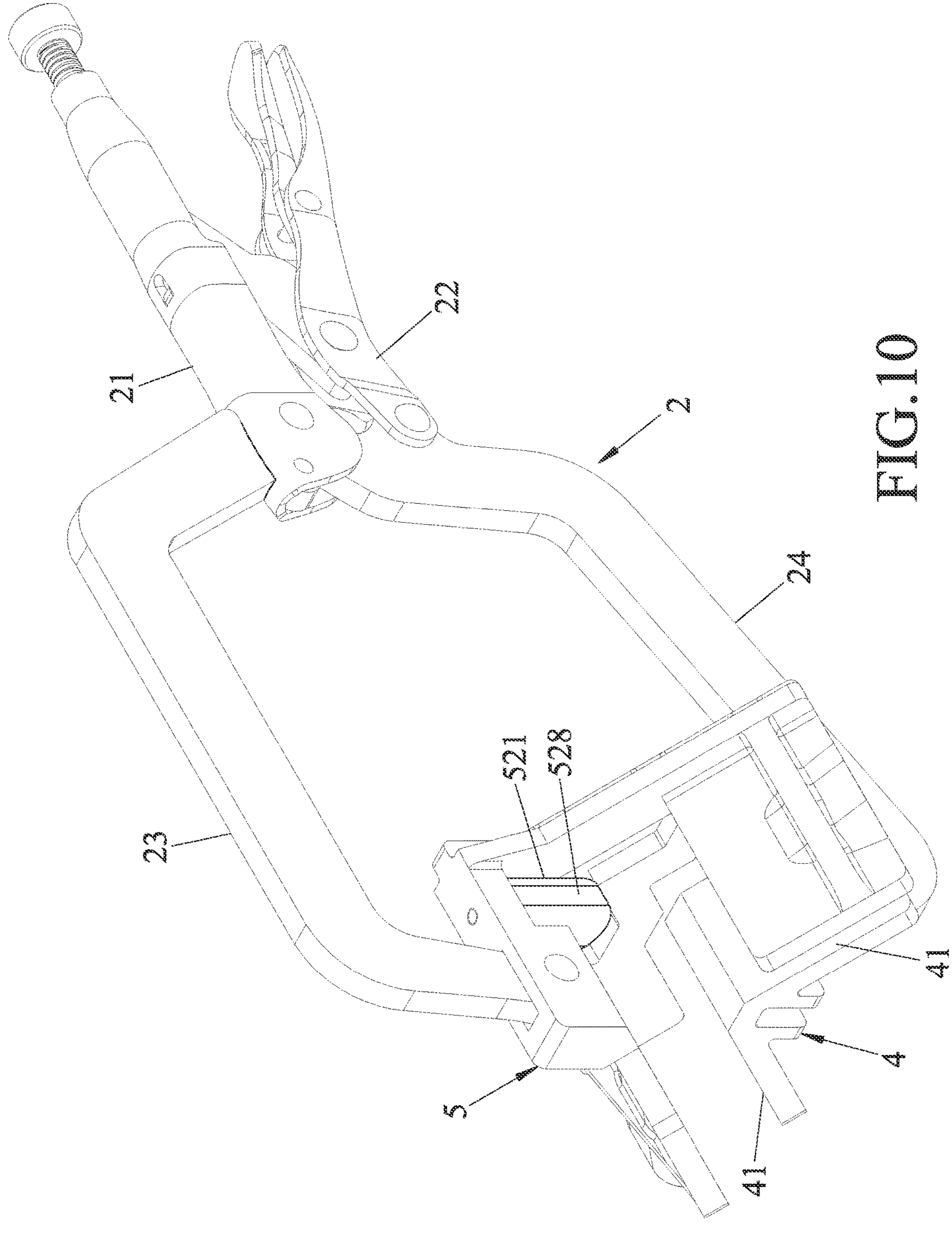
FIG. 10 is a view similar to FIG. 3, but illustrating the reversing member having two tangent surfaces.

It should be noted therein that the reversing member 521 is not limited to a cylindrical shape, as shown in FIG. 3. In other variations of this embodiment, the reversing member 521 may have other shapes, or, as shown in FIG. 10, the cylindrical reversing member 521 may have two tangent surfaces 528 (only one is visible) diametrically opposite to each other and flush with two opposite sides of the mounting plate 514. Through this, an overall aesthetic of the first embodiment may be improved, and it may be easier to hold the reversing member 521 when changing the positions thereof.

Figure 11:
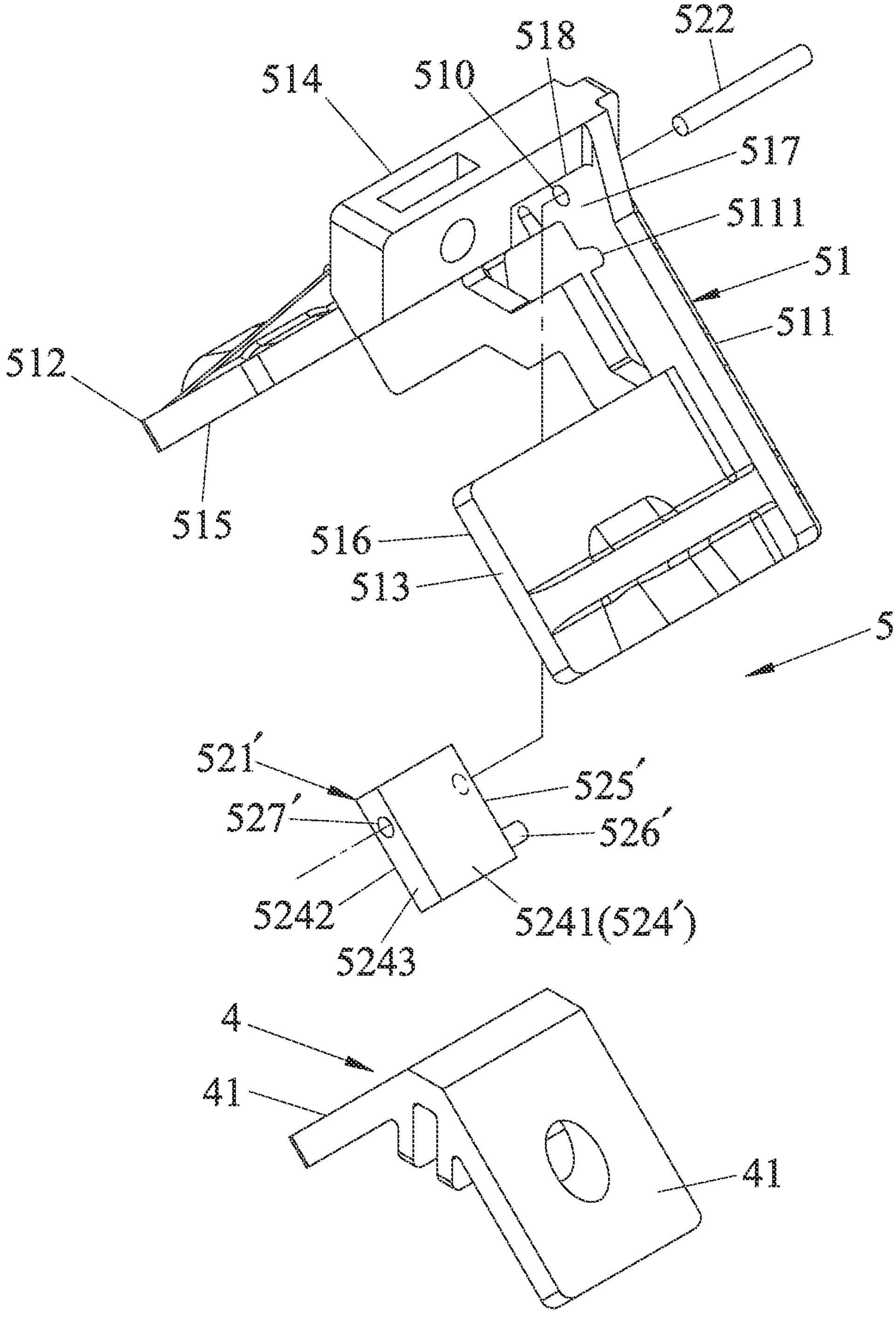
FIG. 11 is a perspective view of a clamping device according to the second embodiment of the present disclosure.
Figure 12:
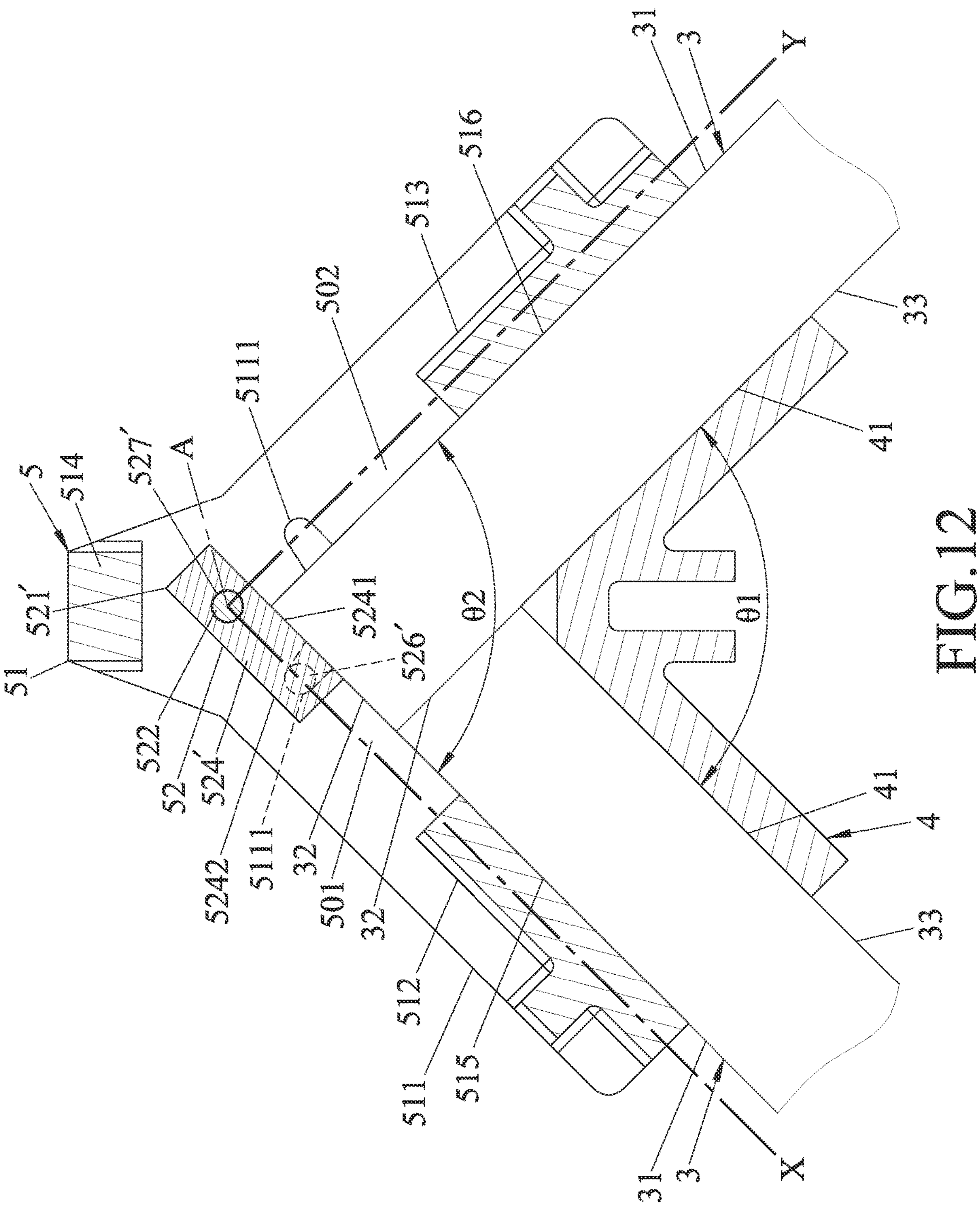
FIG. 12 is a sectional view, illustrating a reversing member of the second embodiment located on a first side.
Figure 13:
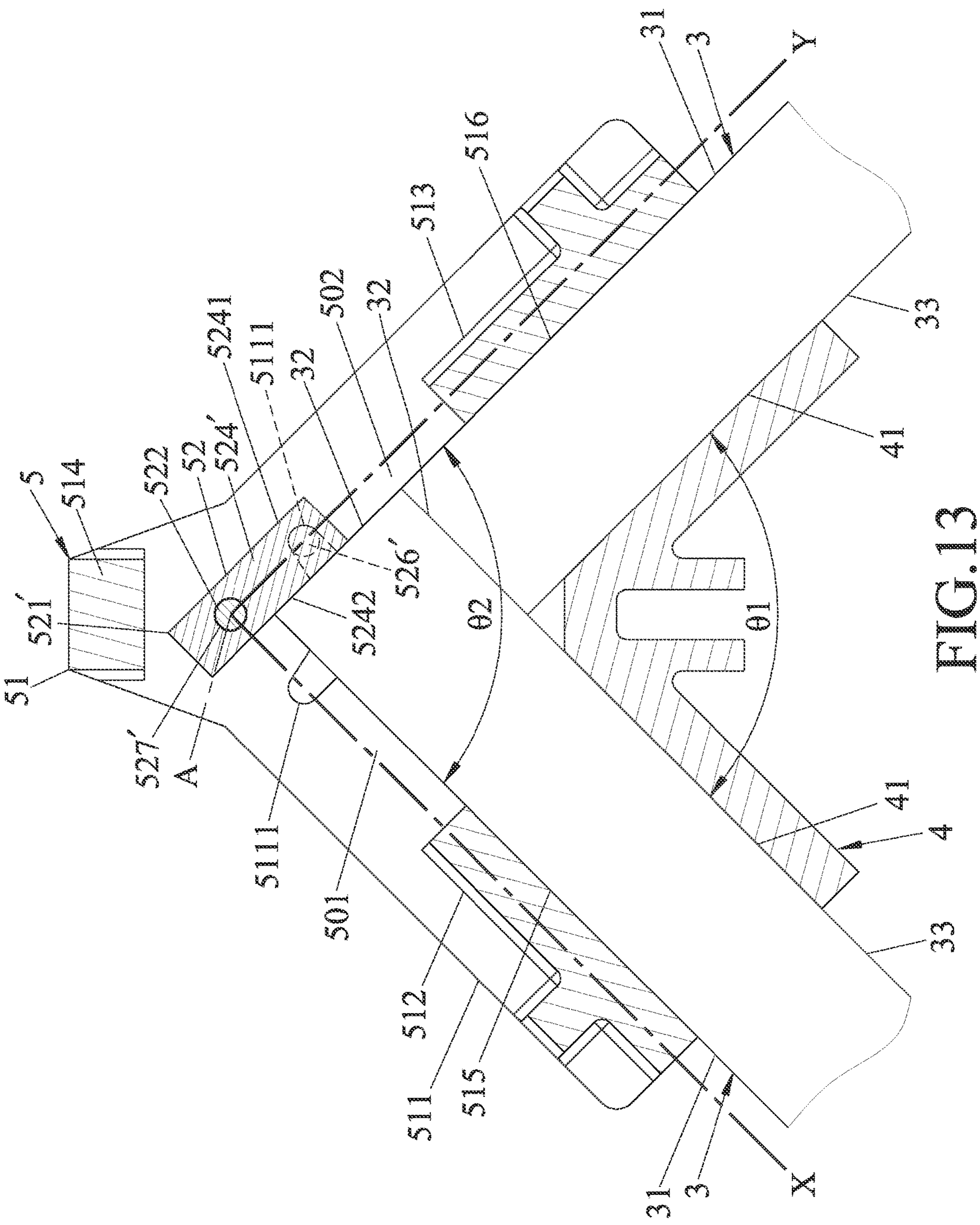
FIG. 13 is another sectional view, illustrating the reversing member of the second embodiment located on a second side.

Referring to FIGS. 11 to 13, a clamping device according to the second embodiment of the present disclosure is shown to be substantially identical to the first embodiment. Particularly, the clamping device comprises the fixing clamp 4 and the positioning clamp 5. The difference between the first embodiment and the second embodiment resides in that, in the second embodiment, the main body 51 of the positioning clamp 5 further includes a through hole 510 extending transversely from the base plate 511 to the mounting plate 514 and communicating with the receiving space 517, and the base plate 511 has two stop recesses 5111 separated by the abutment angle (θ2) and proximate to the mounting plate 514.

Further, in this embodiment, the reversing member 521' has a plate shape, the limiting portion 524' thereof has a first limiting surface 5241 and a second limiting surface 5242 opposite to each other, and an end surface 5243 between the first and second limiting surfaces 5241, 5242 and opposite to the connecting surface 525'. Moreover, the through hole 527' extends from the end surface 5243 to the connecting surface 525', and the engaging portion 526' is a protrusion protruding outwardly from the connecting surface 525' and is spaced apart from the through hole 527'. The bolt 522 extends through the through hole 510 and the through hole 527' and engages the mounting plate 514, so that the reversing member 521' is rotatable about the bolt 522 until the engaging portion 526' abuts against a corresponding one of the stop recesses 5111, and is positioned on the first side or the second side.

With reference to FIG. 12, when the reversing member 521' is located on the first side, the first limiting surface 5241 thereof is perpendicular to the second abutment surface 516, and is aligned with the first abutment surface 515. With reference to FIG. 13, when the reversing member 521' is located on the second side, the second limiting surface 5242 thereof is perpendicular to the first abutment surface 515, and is aligned with the second abutment surface 516. Through this, the reversing member 521' can be simply pushed toward a left side or a right side of the main body 51 to achieve the purpose of changing the positions thereof so as to position the plate pieces 3 respectively extending along the first direction (X) and the second direction (Y) and intersecting with each other to form an "L" shape.

From the aforesaid description, the advantages of this disclosure resides in that: Through the reversing member 521, 521' that is connected to the main body 51 and that is changeable in positions, the plate pieces 3 can intersect with each other in different sides. Further, the reversing member 521' is not only simple in structure and easy to operate, but also is not easy to lose. Hence, convenience and practicality of use and operation of the disclosure can be greatly improved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth subunit that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A positioning clamp suitable for positioning two plate pieces, each of the plate pieces having a first plate surface and an end surface intersecting at an angle, said positioning clamp comprising:

a main body having a first abutment surface and a second abutment surface separated by an abutment angle and suitable for abutting against the first plate surfaces of the plate pieces, respectively, said abutment angle having an apex; and a reversing mechanism including a reversing member rotatably disposed in said main body and proximate to said apex, said reversing member having a limiting portion and being rotatable relative to said main body between a first side, in which said limiting portion is aligned with said first abutment surface and is suitable for abutting against the end surface of one of the plate pieces, and a second side, in which said limiting portion is aligned with said second abutment surface and is suitable for abutting against the end surface of the other one of the plate pieces.

2. The positioning clamp as claimed in claim 1, wherein said abutment angle is between 85° and 95°, and said limiting portion is perpendicular to said second abutment surface when said reversing member is located on said first side, and is perpendicular to said first abutment surface when said reversing member is located on said second side.

3. The positioning clamp as claimed in claim 1, wherein said main body includes a base plate, and a first abutment plate and a second abutment plate connected to said base plate, said first abutment plate having said first abutment surface, said second abutment plate having said second abutment surface.

4. The positioning clamp as claimed in claim 3, wherein said main body further includes a mounting plate connected to said base plate and proximate to said apex, said mounting plate and said first abutment plate defining a first spacing therebetween along a first direction, said mounting plate and said second abutment plate defining a second spacing therebetween along a second direction perpendicular to the first direction.

5. The positioning clamp as claimed in claim 4, wherein said mounting plate has a concave surface defining a receiving space, and at least one retaining portion formed in said concave surface, said reversing member being rotatably disposed in said receiving space and having a connecting surface opposite to said limiting portion, and at least one engaging portion formed on said connecting surface for engagement with said at least one retaining portion, said at least one retaining portion being one of a protrusion and a groove, said at least one engaging portion being the other one of the protrusion and the groove.

6. The positioning clamp as claimed in claim 5, wherein said reversing mechanism further includes a bolt and an elastic element, said reversing member being operable to move in a direction away from said mounting plate and further having a through hole extending from said limiting portion to said connecting surface, said bolt extending through said through hole and engaging said mounting plate so that said reversing member is rotatable about said bolt between a first side and a second side, said elastic element being sleeved on said bolt for biasing said reversing member to move toward said mounting plate.

7. The positioning clamp as claimed in claim 4, wherein said mounting plate has a concave surface defining a receiving space, said reversing member being rotatably disposed in said receiving space, said main body further including a through hole extending through said base plate toward said mounting plate, said reversing mechanism further including a bolt that extends through said through hole in said main body and said reversing member and that engages said mounting plate, so that said reversing member is rotatable about said bolt between a first side and a second side.

8. The positioning clamp as claimed in claim 7, wherein said limiting portion of said reversing member has a first limiting surface and a second limiting surface opposite to each other, said first limiting surface being perpendicular to said second abutment surface and being aligned with said said first abutment surface when said reversing member is located on said first side, said second limiting surface being perpendicular to said first abutment surface and being aligned with said said second abutment surface when said reversing member is located on said second side.

9. The positioning clamp as claimed in claim 8, wherein said base plate has two stop recesses separated by said abutment angle and proximate to said mounting plate, said reversing member further having a connecting surface between said first limiting surface and said second limiting surface, and an engaging portion formed on said connecting surface, said reversing member being positioned on said first side or said second side when said reversing member is rotated about said bolt until said engaging portion abuts against a corresponding one of said stop recesses.

* * * * *